(12) United States Patent
Sharma et al.

(10) Patent No.: US 12,282,879 B2
(45) Date of Patent: Apr. 22, 2025

(54) SYSTEM AND METHOD FOR IDENTIFYING AND UTILIZING AGENT WORKING FROM HOME IMPACT SCORE

(71) Applicant: InContact Inc., Salt Lake City, UT (US)

(72) Inventors: Atish Sharma, Pune (IN); Salil Dhawan, Pune (IN); Madhvi Sharma, Pune (IN)

(73) Assignee: InContact Inc., Salt Lake City, UT (US)

( * ) Notice: Subject to any disclaimer, the term of this patent is extended or adjusted under 35 U.S.C. 154(b) by 237 days.

(21) Appl. No.: 17/852,589

(22) Filed: Jun. 29, 2022

(65) Prior Publication Data

US 2024/0005254 A1    Jan. 4, 2024

(51) Int. Cl.
*G06Q 10/0639* (2023.01)

(52) U.S. Cl.
CPC .............................. *G06Q 10/06393* (2013.01)

(58) Field of Classification Search
CPC ................... G06Q 10/06393; G06Q 10/06398
See application file for complete search history.

(56) References Cited

U.S. PATENT DOCUMENTS

| | | | |
|---|---|---|---|
| 5,940,494 A * | 8/1999 | Rafacz ............... | H04M 3/51 715/744 |
| 8,078,486 B1 * | 12/2011 | McLean ......... | G06Q 10/063114 705/7.14 |
| 10,230,592 B2 * | 3/2019 | Scholz ............ | H04L 41/5032 |
| 11,178,282 B1 * | 11/2021 | Ramachandran ... | H04M 3/5175 |
| 11,553,090 B2 * | 1/2023 | Traba ............... | G06Q 10/06398 |
| 2022/0092512 A1 * | 3/2022 | Dhawan ........... | G06Q 10/06398 |
| 2022/0138650 A1 * | 5/2022 | Lakshmanan ...... | G06Q 30/0203 705/7.36 |
| 2022/0400065 A1 * | 12/2022 | Cioffi ....................... | H04L 43/55 |
| 2023/0179712 A1 | 6/2023 | Mecayten et al. | |
| 2023/0222408 A1 * | 7/2023 | Giri ................ | G06Q 10/063112 705/7.14 |
| 2023/0222425 A1 * | 7/2023 | Giri .................. | G06Q 10/06398 705/7.39 |
| 2023/0222426 A1 * | 7/2023 | Swift ............... | G06Q 10/06393 705/62 |

FOREIGN PATENT DOCUMENTS

CA         3009944 A1 *  4/2017  ............. G06N 20/00

\* cited by examiner

*Primary Examiner* — Dylan C White
(74) *Attorney, Agent, or Firm* — PEARL COHEN ZEDEK LATZER BARATZ LLP

(57) ABSTRACT

A computerized system and method may analyze data representing remotely connected computer systems, which may be for example used by agents as part of their activity and/or routine within a given system or organization, to assess and/or quantify critical factors that may impact the output and/or efficiency for a given agent or a plurality of agents within the system or organization. In a computerized-system comprising one or more processors, and a memory including a data store of agents' data and metrics, embodiments of the invention may collect a plurality of data streams, which may include call and/or chat data and/or metadata; store the data streams in an appropriate database; periodically extract parts of the stored data from the database, and calculate effectiveness scores based on the extracted data; and transmit the calculated scores to potential data utilizers and/or target applications, to be presented via a user interface thereof.

20 Claims, 5 Drawing Sheets

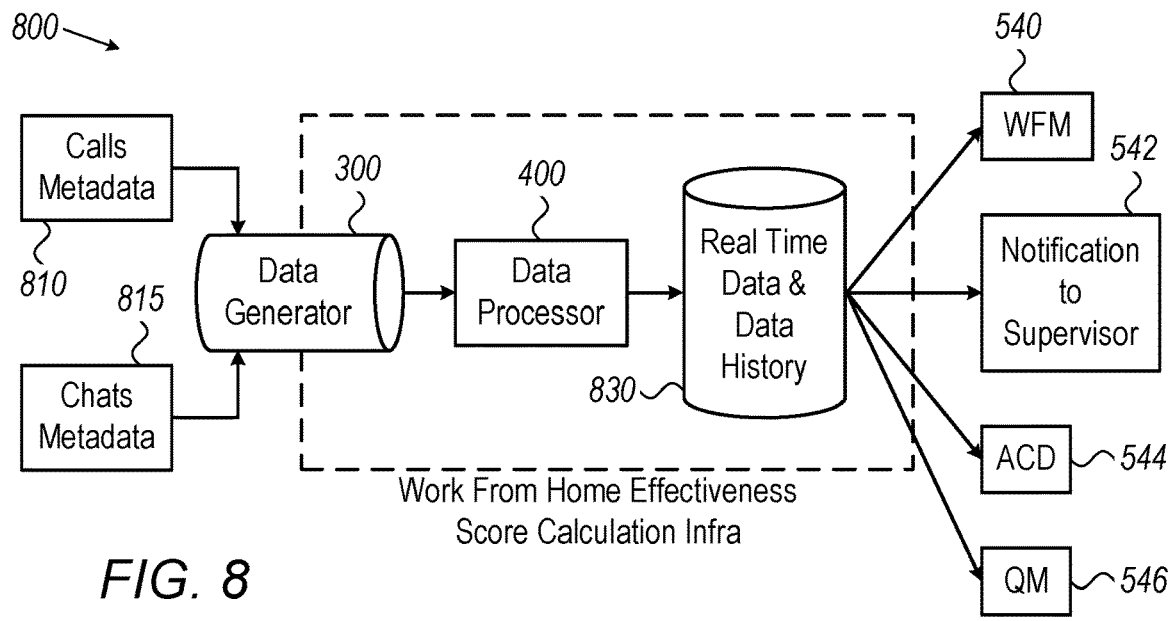
FIG. 8
FIG. 9
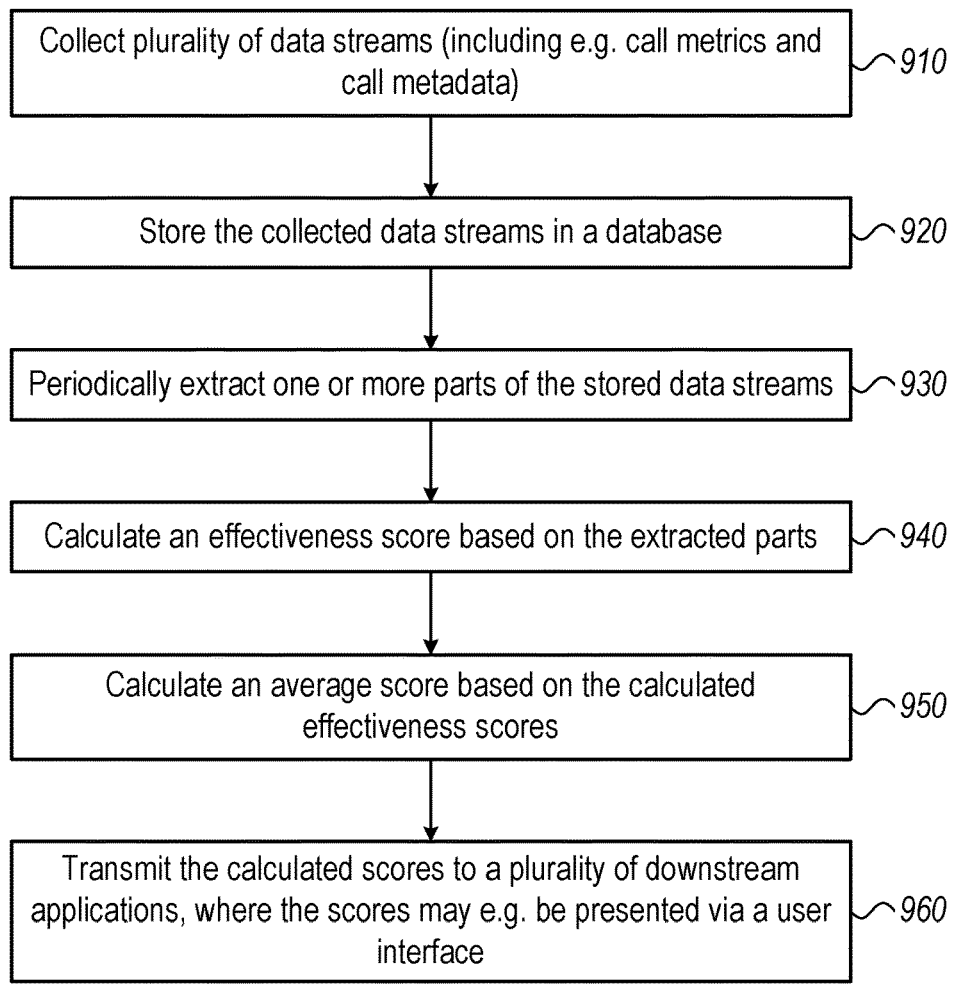

SYSTEM AND METHOD FOR IDENTIFYING AND UTILIZING AGENT WORKING FROM HOME IMPACT SCORE

FIELD OF THE INVENTION

The present disclosure relates to the field of data analysis and more specifically to assessing the quality of work for agents working from home, for example in a hybrid contact center work environment.

BACKGROUND OF THE INVENTION

With organizations switching to 'Working From Home' (WFH) mode, where workers or agents are able and allowed to perform work and work-related tasks from a location remote from the 'office' or official workplace (increasingly on permanent basis, for example due to pandemic circumstances and corresponding restrictions and/or limitations), it has become important for the organizations to ensure employees are as much productive from 'home' (or from any alternative remote location) as they were from 'office'. With WFH becoming a de facto standard for a substantial amount of the organizations, a different, updated approach for assessing the quality of a given agent's work may be of essence. A contact center entity (agent, supervisor etc.), for example, may behave and/or perform very differently in a WFH setting, compared to its functioning in a 'Work from Office' environment. In this context, different factors besides the agents' skills and controlled activities—such as network issues, power outages, increased background noise, and the like—may also impact and/or affect a given agent's performance. In addition, a given agent may be most effective while working during certain hours throughout the day, which may not necessarily be correlated with official working hours in an office environment. Thus, there is a need for organizations to plan agent work timings more effectively which will improve the contact center performance in a WFH framework.

In this context, there may be times when an agent might not be capable of attending calls (for example due to factors like health concerns, network issues, and the like), while he/she can still handle other communication channels such as text-based chat or email messages. A contact center, for example, may take such factors into consideration and assign appropriate work tasks to the agent according to his/her condition.

SUMMARY OF THE INVENTION

A computerized system and method may analyze data representing remotely connected computer systems, which may be for example used by agents as part of their activity and/or routine within a given system or organization, to assess and/or quantify critical factors that may impact the output and/or efficiency for a given agent or a plurality of agents within the system or organization. In a computerized-system comprising one or more processors, and a memory including a data store of agents' data and metrics, embodiments of the invention may collect a plurality of data streams, which may include call and/or chat data and/or metadata; store the data streams in an appropriate database; periodically extract parts of the stored data from the database, and calculate effectiveness scores based on the extracted data; and transmit the calculated scores to potential data utilizers and/or target applications, to be presented via a user interface thereof.

Embodiments may thus utilize extracted or collected data by which a given agent's activity may be monitored—and process the collected data to calculate effectiveness scores using appropriate formulas and/or additional metrics and/or indicators. Embodiments may accordingly include a plurality of components and modules (such as for example a data generator module, a data processing or processor module, and a data utilizer module) to carry out different operations as for example described herein. Data used and/or scores calculated by embodiments of the invention may be stored in and extracted from a plurality of appropriate databases.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 8 depicts a high-level architecture of an exemplary computerized system and method according to some embodiments of the invention.

FIG. 9 is a flowchart depicting a simple method for analyzing data representing remotely connected computer systems according to embodiments of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention may provide a method for analyzing data representing remotely connected computer systems or their activity (which may be for example used by workers or agents as part of their work routine) thus providing a solution for assessing and/or quantifying critical 'Working From Home' (WFH) factors that may impact the output and/or work efficiency for a given agent in an organization. Such organization may thus apply some embodiments of the invention for optimizing and/or improving the effectiveness and/or productivity of a worker or agent, or plurality of workers or agents, in a WFH status or setting. In the present disclosure, a contact center will be used as a non-limiting example for an organization which may utilize embodiments of the invention at hand. Those skilled in the art will recognize, however, that different embodiments may be used for various kinds of organizations—which may operate a plurality of agents involved in different activities than the ones considered in a contact or call center environment. The contact center example in the present disclosure should thus be considered as non-limiting.

Figure 1:
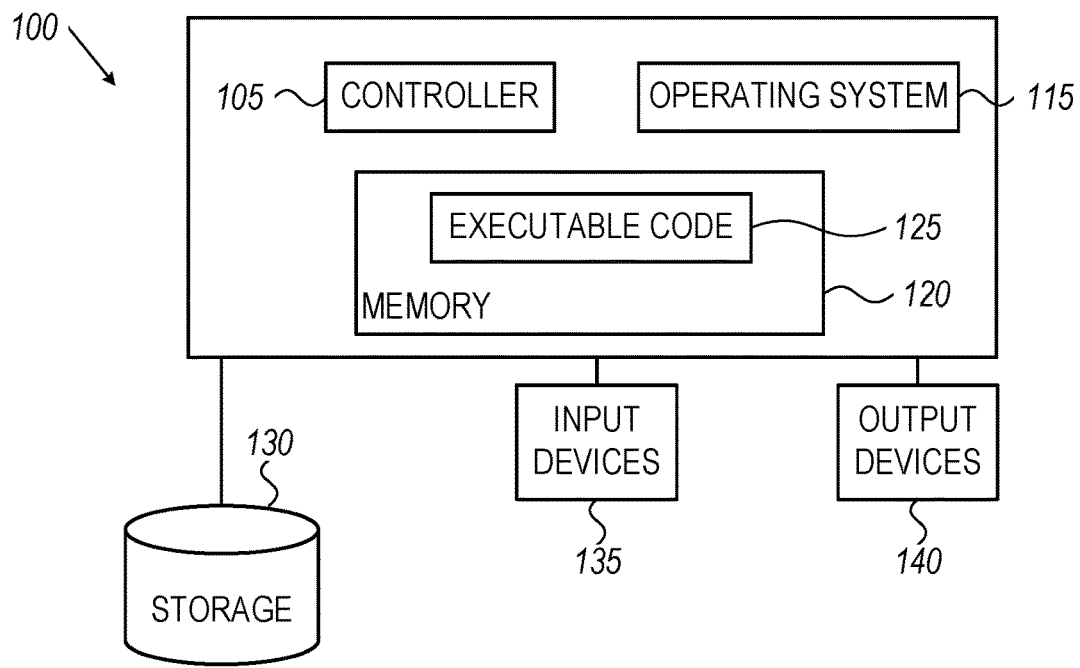
FIG. 1 is a high-level block diagram of an exemplary computing device which may be used with embodiments of the invention.

FIG. 1 shows a high-level block diagram of an exemplary computing device which may be used with embodiments of the invention. Computing device 100 may include a controller or processor 105 (or, in some embodiments, a plurality of processors) that may be, for example, a central processing unit processor (CPU), a chip or any suitable computing or computational device, an operating system 115, a memory 120, a storage 130, input devices 135 and output devices 140 such as a computer display or monitor displaying for example a computer desktop system. Each of the procedures and/or calculations discussed herein, and the modules and units discussed, may be or include, or may be executed by, a computing device such as included in FIG. 1, although various units among these modules may be combined into one computing device.

Operating be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of possibly different memory units. Memory 120 may store for example, instructions (e.g. code 125) to carry out a method as disclosed herein, and/or data such as low level action data, output data, etc. In some embodiments of the invention, memory 120 may include a data store of agents' data and metrics as further disclosed herein.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIGS. 2-6 according to embodiments of the invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as user action data or output data may be stored in a storage 130 and may be loaded from storage 130 into a memory 120 where it may be processed by controller 105. In some embodiments, some of the components shown in FIG. 1 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Memory or memory units 120 may include a data store of skills data, and/or a data store of agents' data and metrics, or data and metrics recorded from a remote computer or a plurality of remote computers, such as further disclosed herein. The processor or processors 105 may operate one or more modules such as a data collector or data generator module, data processing module, and so forth, as further disclosed herein. It should be noted that a plurality of physically-separate computer systems and/or computational resources which may or may not correspond to the architecture of system 100 (and may include for example ones provided via cloud platforms and/or services) may be for example connected via a data network as a multi-memory and/or processor system, which may be used in some embodiments of the invention. Those skilled in the art may recognize that a plurality of computer system architectures may be used in different embodiments of the invention.

Figure 2:
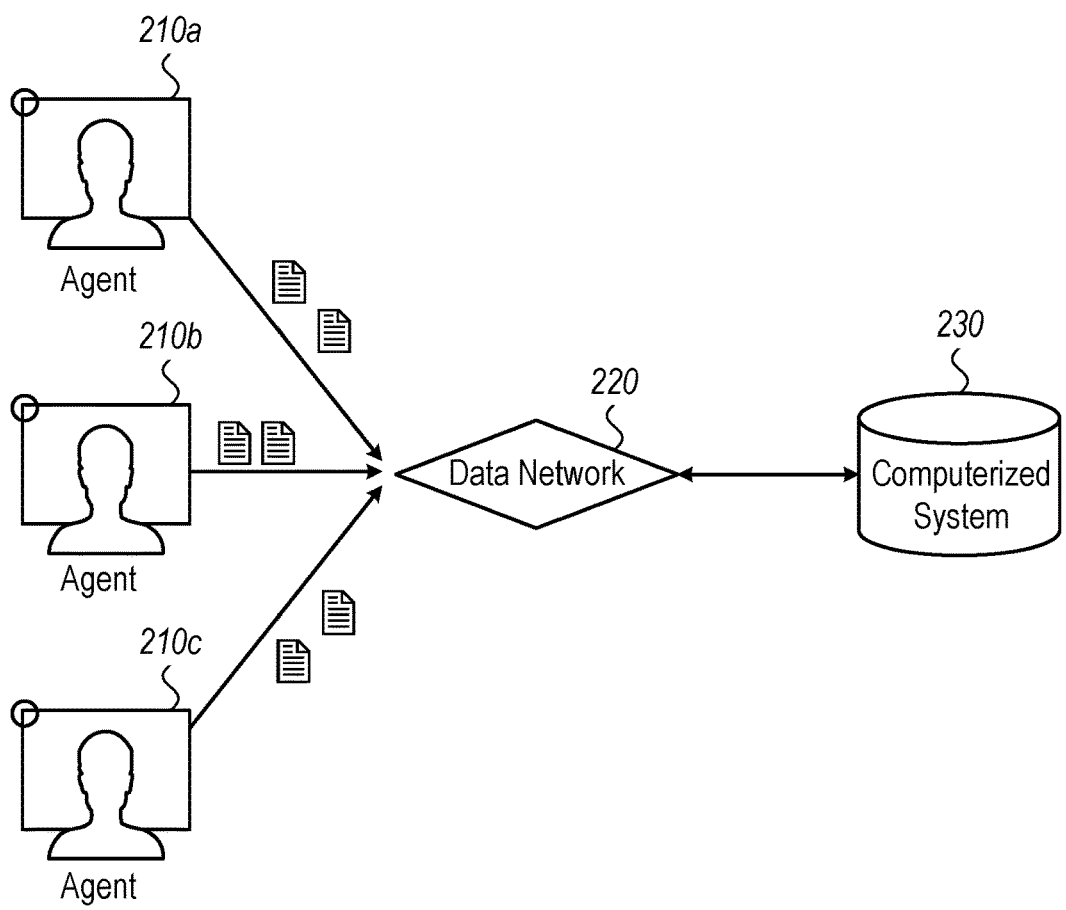
FIG. 2 illustrates a set of remote computer systems connected, via a data network, to a computerized system which may be used in some embodiments of the invention.

Embodiments of the invention may involve sending a plurality of data items from a plurality of remote computers via for example a data network, and analyzing, by a computerized system (which may conform e.g. to the specifications of system 100) data representing the remote computers, and/or a plurality of remotely-connected computer systems. FIG. 2 illustrates a set of remote computer systems connected, via a data network, to a computerized system which may be used in some embodiments of the invention. Remote computers 210, which may for example be operated by a plurality of workers or agents (in this simplified, non-limiting case, three agents are considered, corresponding to remote computers 210*a-c*), may send or transmit, over data network 220, a plurality of data items (which may be for example data streams as further discussed herein) to computerized system 230 (which may for example conform to the architecture of system 100, and include a plurality of dedicated modules and/or components as further described herein) in order to carry out various steps which may be required for data processing and/or corresponding calculations according to some embodiments of the invention. In some embodiments, computerized system 230 may additionally perform a plurality of operations including for example sending and/or transmitting and/or collecting and/or receiving data (such as for example processed data and/or calculated results) to or from additional remote computers or computerized systems (which may include for example a cloud-based database or remote services as further described herein). Those skilled in the art may recognize that additional and/or alternative remote and/or computerized systems and/or network and connectivity types may be included in different embodiments of the invention.

Embodiments of the invention may utilize recorded and/or extracted and/or collected data by which for example a given worker or agent's activity or work may be monitored, process the data in order to calculate various metrics and/or performance indicators, and send the calculated metrics and/or indicators to potential utilizer entities, such as (but not limited to) workforce quality management computer programs and/or applications. Embodiments of the invention may thus employ a data generator module to generate and/or provide data points which may be further processed to calculated agent metrics as described herein; a data processor module to calculate and/or assess the effectiveness of a given agent based on the provided data points; and a data utilizer module to send or transfer results (calculated by for example the data processor module) to various computer programs and applications which may make further use and perform additional manipulations and processing on such results. Those skilled in the art would recognize, however, that various alternative modules and workflows may be used in different embodiments of the invention, and that any particular embodiment considered herein (which may primarily consist of these three modules) should not limit the scope of the invention.

Figure 3:
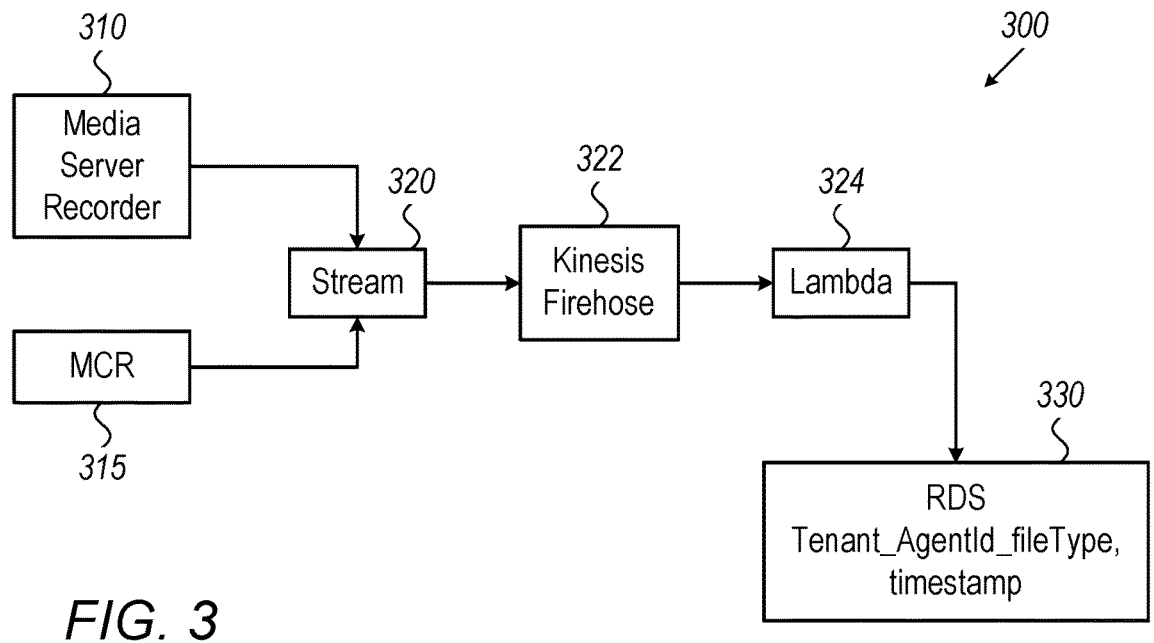
FIG. 3 illustrates an example data generator module according to some embodiments of the invention.

FIG. 3 illustrates an example data generator module 300 which may be used in some embodiments of the invention. Considering the (nonlimiting) example of a contact center, data generator module 300 may comprise a media server recorder 310 and/or multi-channel recording (MCR) server or service 315, which may be existing (black-box like) call recorders generally responsible for gathering or collecting call data and/or metadata describing data operated on, sent or received by the computer on which data generator module 300 executes; such data may thus be recorded from a remote computer or a plurality of remote computers and represent work activities of a given agent (e.g. an agent operating the computer). Data collected and/or generated by data generator module 300 may include, e.g. call metrics, call metadata, chat metrics, and chat metadata—such as for example agent response times, abandonment frequency or percentage (which may correspond to, e.g., calls accepted but not serviced by the agent), resolution or success frequency or percentage (which may correspond to calls accepted and serviced by the agent), 'on hold' frequency or percentage (which may be e.g. the number of times a call was put on hold by a given agent, or the frequency at which calls are put on hold by the agent), customer sentiment or satisfaction scores, and agent sentiment or satisfaction scores for a plurality of calls and/or interactions (see below data structures in Tables 1-2 for non-limiting examples for output data provided by the data generator module 300). Such data may then be sent or transferred from call recorders 310 and/or 315 (for example at predefined time intervals—e.g., every X seconds) as data stream 320. Data stream 320 may eventually be stored in a database—which may be for example a cloud-based service such as for example relational database service (RDS) 330. In some embodiments of the invention, additional units may mediate, link or bridge data stream 320 and RDS 330. For example, a mediator Kinesis Firehose unit 322 may read data from stream 320 (which may be for example a Kinesis stream) and triggers a "lambda" function function 324 to store the data in RDS 330. Those skilled in the art would recognize, however, that alternative components and/or protocols for collecting and analyzing data streams in real time may be used in different embodiments of the invention. In some embodiments, data collected, gatherer, generated and stored by data generator module 300 (which may be for example a plurality of data streams as noted herein) may be organized and/or sorted according to one or more parameters associated with a particular agent and/or call. Such parameters may for example include agent and/or identifiers. Those skilled in the art would recognize that similar or equivalent parameters and identifiers may be used in different embodiments of the invention which may not, for example, be limited to contact centers. Embodiments of the invention may thus collect or gather a plurality of data streams comprising for example call metrics and/or metadata, and store the data streams in a database, such that the data streams may be for example further processed and used in calculating WFH effectiveness scores as further explained herein.

In some embodiments, a streaming service (which may be for example remote and/or cloud-based) may generally be used for example as part of or instead of data generator module 300 in order e.g. to record a plurality of data and metrics to be used in some embodiments of the invention. An appropriate streaming service may be for example any open-source distributed event streaming platform used for high-performance data pipelines, streaming analytics, data integration, and mission-critical applications; a variety of such event streaming platforms, including but not limited to ones provided by for example Amazon Web Services (such as the Kinesis platform considered herein), are known in the art and may be used in different embodiments of the invention. Such streaming service may thus capture data in real-time from event sources such as online databases, as well as sensors, mobile devices, cloud services, and software applications in the form of event streams (which may be organized for example as tables, which may e.g. conform to the format and include a plurality of fields such as those illustrated by Tables 1-2, which should be considered as non-limiting examples); storing these event streams in dedicated databases for later retrieval; manipulating, processing, and reacting to the event streams in real-time as well as retrospectively; and routing the event streams to different destination addressees (such as for example computer programs and applications) as needed. The streaming service may thus ensure a continuous flow of data which may be readily processed and interpreted by subsequent components of the invention, such as, for example, the data processor module. Data streams may be generated periodically (e.g., every X seconds/hours) in order for example to monitor agents' activity in real time; similarly, data streams may be collected periodically by further components of the invention (such as a data processor module) as further explained herein.

Data provided by for example by data generator module 300 may be for example call metadata such as e.g. number of calls accepted, number of calls dropped, response time to pick any call, signal-to-noise ratio per call—and/or chat metadata such as e.g. number of chats responded, response time to reply a given chat, and so forth. Based on such data recorded from a remote computer or a plurality of remote computers, desirable and significant work-related factors—such as for example agent call-drop rate, call noise factor, agent availability, agent's missed contact, average contact response time, agent health score, agent key performance indicators (KPIs) score, agent sentiments score, and the like—may be calculated. Data required to calculated or derive additional or different factors may be used in different embodiments of the invention.

In some embodiments, data streams, data, and/or metadata which may for example correspond to parts of such streams and be generated or collected by data generator module 300 may be organized or stored for example according to the following example format:

TABLE 1

Agent Metadata Store RDS

Agent Id: UUID
Call/chat accepted: Boolean
Nosie factor: decimal
Response time: Number
Call/chat dropped: Boolean
Total calls/chats: Number
File Type: Number
Tenant Id: UUID
ContactId: UUID to include one or more identifiers describing for example a plurality of agents or an agent being monitored, as well as a tenant and/or contact associated with a call or chat and/or a plurality of calls or chats—in addition to one or more variables to describe (for example per a single call or within a given timeframe such as e.g. one hour) an acceptance or a drop of a call/chat and/or a plurality of calls/chats, a total number of calls/chats, and, for a call/chat or a plurality of calls/chats, a noise factor, a response time, and a file type. Alternative formats and sorting schemes may, however, be used in different embodiments of the invention for example to describe various call and/or chats activity by an agent or a plurality of agents.

Figure 4:
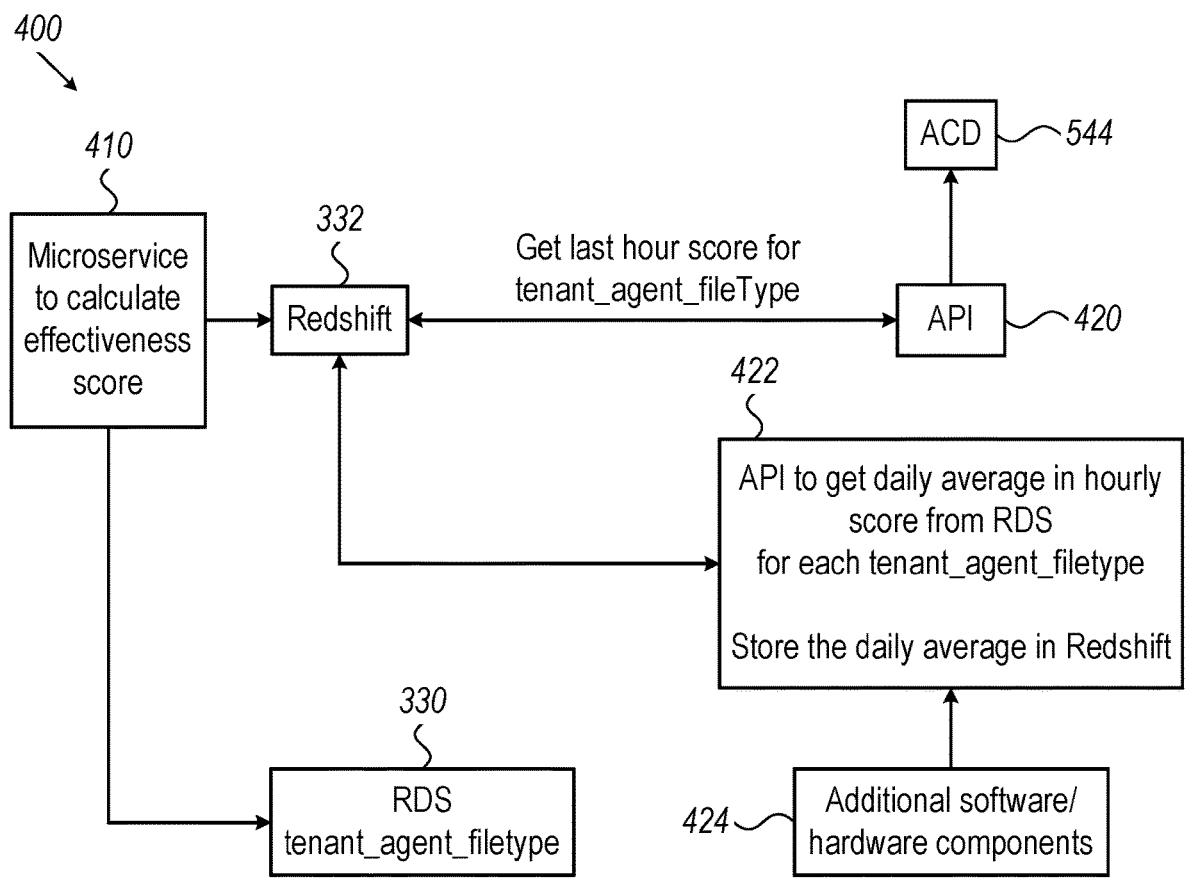
FIG. 4 depicts an example data processor module according to some embodiments of the invention.

Data collected, gathered, generated, stored, or provided by for example data generator module 300 (which may correspond to, e.g., call data and metadata describing an agent's activity as part of a contact center) may be further sent or transferred to a data processor module, which may be used for example to query, extract or collect one or more sections or parts of the stored data streams and calculate various work-related factors to assess the WFH effectiveness for a given agent based on the extracted parts as explained herein. FIG. 4 depicts an example data processor module 400 which may be used in some embodiments of the invention. A scheduled procedure, job or microservice 410 may be configured to periodically (e.g., every hour) query, collect, extract, or gather a plurality agent data (for example a section or part or a plurality of parts of a data stream or a plurality of data streams describing the agent's activity during the preceding hour) generated by data generator module 300 and stored in a database, which may be for example RDS 330. Microservice 410 may then calculate an agent WFH effectiveness score based on the extracted data streams or parts of data streams for a given period of time described by the data queried, using an agent WFH effectiveness formula as further described herein. Data processor module 400 may subsequently store the calculated effectiveness scores in a database (which may or may not be RDS 330) for further and/or later use. Stored WFH effectiveness scores may then periodically be extracted, retrieved or collected by additional, intermediate software and/or hardware components, which may for example be configured to do so via application programming interfaces (APIs) such as 420 and 422. The latter may for example send, transmit, or forward the calculated scores to potential data utilizers (for example by a data utilizer module as further explained herein), which may be, e.g., a variety of computer program and/or applications associated with the contact center's automatic call distributor (ACD) 544. Additionally or alternatively, intermediate software and/or hardware components 424 (which may correspond to, for example, the execution of a lambda function for collecting and analyzing data streams in real time, as known in the art) may be configured to perform additional manipulations and take additional processing actions, such as for example to calculate an average effectiveness score (such as for example a daily WFH effectiveness score) based on for example input hourly effectiveness scores, and to store the corresponding output results in a database (which may or may not be RDS 330). In some embodiments (employing for example the particular architecture depicted in FIG. 4), an auxiliary database 332 may be used to store WFH effectiveness scores calculated by microservice 410 before being collected by intermediate software and/or hardware components such as 420 and 422. Auxiliary database or data warehouse 332 may thus be specifically appropriate for supporting multiple queries per unit time in order to ensure optimal flow of information (this may be achieved, for example, using could data warehouse services such as for example the Amazon Redshift service; alternative infrastructures and services may be used in different embodiments of the invention).

In order to calculate agent WFH effectiveness scores, data processor module 400 may apply dedicated effectiveness score formulas to appropriate input data and/or metadata (e.g., data streams or parts of such streams collected or extracted by data generator module 300 as described herein and illustrated e.g. in Table 1). In some embodiments of the invention, an hourly effectiveness score formula for an agent servicing calls in a contact center may be, for example:

$$es_h(\text{call}) = \frac{-na - D_c \times cd}{tc} + (tc - na - cd)\left[S_c\left(\frac{snr}{SNR} - 1\right) - T_c\left(\frac{rt}{RT} - 1\right)\right] \quad (1)$$

Where $es_h$ is the calculated hourly effectiveness score, and—in accordance with the example Agent Metadata Store of Table 1—tc is the total number of calls received within the hour under consideration (which may be e.g. "total calls" in Table 1), na is the number of calls not accepted by the agent (for example by subtracting the number of calls for which the "call accepted" variable is found negative, for the total number of calls for the agent within the specified hour), cd is the number of calls disconnected or dropped by the agent (e.g. abruptly, without a proper termination of the call by the agent, which may signify that the call has not been serviced properly; in some embodiments this is according to a confirmation by the agent and/or a calling customer), snr is an hourly average signal-to-noise ratio (which may for example be provided by call recorders and collected by data generator module 300 as part of the data streams considered herein), rt is an hourly average agent response time (in seconds; which may describe the time that has passed from the receiving of a call by the contact center to the accepting of the call by the relevant agent), SNR is a predefined minimum signal-to-noise threshold required for audio calls, and RT is a predefined maximum response time threshold (in seconds) allowed for calls answered by the agent. $D_c$, $S_c$, $T_c$ are priority constants or weights that may be altered and/or calibrated according to for example a supervisor's preferences (depending for example on which factors are considered more important by the supervisor e.g. in the context of monitoring work effectiveness).

A similar hourly effectiveness score may be calculated for an agent servicing chats in a contact center. An appropriate formula may be for example:

$$es_h(\text{chat}) = \frac{ch}{CH_c} - \frac{rt}{RT} + 1 \quad (2)$$

Where ch is the total number of chats handled by the agent within a given hour, and $CH_c$ is a predefined threshold reflecting the minimum number of chats to be handled within an hour by a given agent.

In eq. (1)-(2), tc, cd, snr, ch, and r t may be drawn directly (e.g., using elementary arithmetic operations) from data stored in a database (e.g., RDS 330) by data generator module 300, while thresholds and weights may be set independently from gathered data. Alternative formulas (which may or may not employ different data and information describing a given agent's work per unit of time (including for example units not limited to hours), which may or may not be related to calls, chats, or any contact center related activities) may be used in different embodiments of the invention.

Embodiments may further calculate average effectiveness scores based on underlying WFH effectiveness scores (such as for example the hourly effectiveness scores described herein). In some embodiments, a daily effectiveness score may be calculated according to the following formula:

$$es_d = \frac{1}{n}\sum_{h=1}^{n} es_h \quad (3)$$

Where es d is the calculated daily WFH effectiveness score, n is the number of hours a given agent has worked per day, and $\Sigma_{h=1}^{n} es_h$ is the sum of hourly effectiveness scores (for example ones calculated according to formulas 1 or 2 herein) for the agent calculated during that day for hours (h) 1 to n.

In some embodiments, database or databases containing a plurality of calculated effectiveness scores may include and/or be sorted or organized according to agent details or identifiers, such as for example:

Agent A = {
    agentId : 435, agentWFHEffecivesnessScore: 6.73
}

Additionally or alternatively, WFH effectiveness scores may be organized and stored for example according to the following example format:

TABLE 2

Work From Home Effectivess DataStore

Agent Id: UUID
Agent Info: String
MeanWorkFromHomeEffectivessScore: Integer
LastWorkFromHomeEffectivessScore: Integer
Time StampOfLastInteraction: DateTime
WorkFromHomeEffectivenessScoreCount: Integer It should be noted, however, that alternative sorting and storing schemes (e.g., by a call identifiers) and data structures (tables, graph databases, and more) may be used in different embodiments of the invention.

In some embodiments of the invention, additional subscores may be calculated (for example by data processor module 400) as part of the agent WFH effectiveness scores, e.g., in order to provide additional input variables for an appropriate effectiveness score formula. Such subscores may describe for example a given agent's health (based on for example self-reporting by the relevant agent, or based on medical examinations and/or reports provided by the agent), and a given agent's sentiment (for example a self-reported satisfaction score regarding his/her position and/or the company or call center in which he/she is employed)—as well as a plurality of key performance indicators describing for example a given agent's performance in the context of a given task or a set of tasks. All such subscores may for example use data gathered or collected from a given agent and/or a plurality of agents using an appropriate user interface (for example of a computer program or application installed on a personal computing device used by a relevant agent) and processed and/or stored (for example by appropriate components such as data generator module) in a corresponding database or a plurality of databases. Different sources of data and formulas used to calculated subscores, as well as the number and contents of the subscores themselves may vary in different embodiments of the invention.

WFH effectiveness scores may be transmitted, sent to or collected by for example a data utilizer module, comprising or communicating with a plurality of data utilizers, which may be for example various target computer programs or applications associated with for example the contact center used as an example throughout the present document. Data utilizers may include for example workforce management (WFM), quality management (QM), and ACD related programs and applications—as well as additional (possibly remote) computer systems and/or applications which may correspond to, e.g., supervisor dashboard or device responsible for monitoring work effectiveness (a supervisor may thus operate such monitoring device, dashboard, or application in order to for example follow score statistics calculated by embodiments of the invention). Embodiments of the invention may provide WFH effectiveness scores to data utilizers such as the above in order to, for example, assist in effective interaction routing for a given agent (for example reducing contact drop rate and improving overall contact center efficiency); in predicting and directing the work hours of a given agent according to past statistics, indicating enhanced productivity during certain time periods; in identifying problems or issues faced by a given agent (for example by a monitoring supervisor); and in measuring or predicting quality-related factors (for example call quality for a given agent during, e.g., afternoon hours).

A data utilizer module and the corresponding data utilizers may respond to agents' statistics (which may be for example calculated WFH effectiveness scores) by performing appropriate automated actions, as further demonstrated herein. In some embodiments of the invention, a data utilizer module may be responsible for the sending or transmitting of calculated effectiveness scores to a plurality of data utilizers (such as for example computer programs and applications as discussed herein) which are physically and/or virtually separate from the data utilizer module itself (such utilizers may thus not have direct interface to the data utilizer module, and may thus receive for example calculated effectiveness scores by e.g., reading of a corresponding text file—which may periodically and automatically be generated and sent by the data utilizer module to include the relevant data).

Embodiments of the invention may provide key inputs to an ACD program, application, or module—which may for example incorporate call or chat routing for a given agent based on WFH effectives scores. In such manner, an automatic ACD framework may for example first detect an incoming call from a customer, and identify agents eligible and/or available to accept the call, as known in the art; it may then, however, request or query for WFH effectiveness scores for the agents found available—which may for example be provided to it by via a response from data utilizer module 400 as explained herein. Once such scores are provided to it, the ACD framework may for example select the eligible or available agent with the highest effectiveness score to accept the call; the call may then automatically be routed to that agent. A non-limiting example of such utilization of inputs provided by some embodiments of the invention may be seen, for example, in FIG. 6, as further discussed herein.

As noted herein, embodiments may send agent data (e.g., calculated WFH effectiveness scores) to QM programs or applications. This may allow for example to identify interactions (e.g., calls and/or chats) by specific agents characterized by low WFH effectiveness score. QM programs may thus respond with automated actions such as providing appropriate training programs (which may be, for example, instruction videos) to these specific agents, as known in the art.

Embodiments may provide inputs to supervisor devices or dashboards which may evoke adequate alerts so as for contact center to assess whether there is an increasing number of agents with low WFH effectives score. In such case, interaction (e.g., calls and/or chats) routing frameworks may be changed (e.g. automatically, without further intervention by a user) by for example an appropriate ACD program or application as demonstrated herein in order to improve overall work productivity and quality.

Embodiments may provide input to WFM applications that may respond with automated actions such as, e.g., assigning agents to working from home or from the office based on their measured, calculated, or predicted work productivity in each of the latter working modes (an agent with low WFH effectiveness score may, in some embodiment, be prioritized to work from the office in case his productivity at a WFH mode is substantially compromised). In some embodiments, WFM applications may use or utilize calculated effectiveness scores for example as additional data points and/or attributes and/or features according to which a schedule may be determined for a given agent. The automatic determination and/or calculation of work schedules based on a plurality of data and/or attributes and/or features (which may for example be input to classification learning models and/or a variety of machine-learning techniques) is known in the art.

Figure 5:
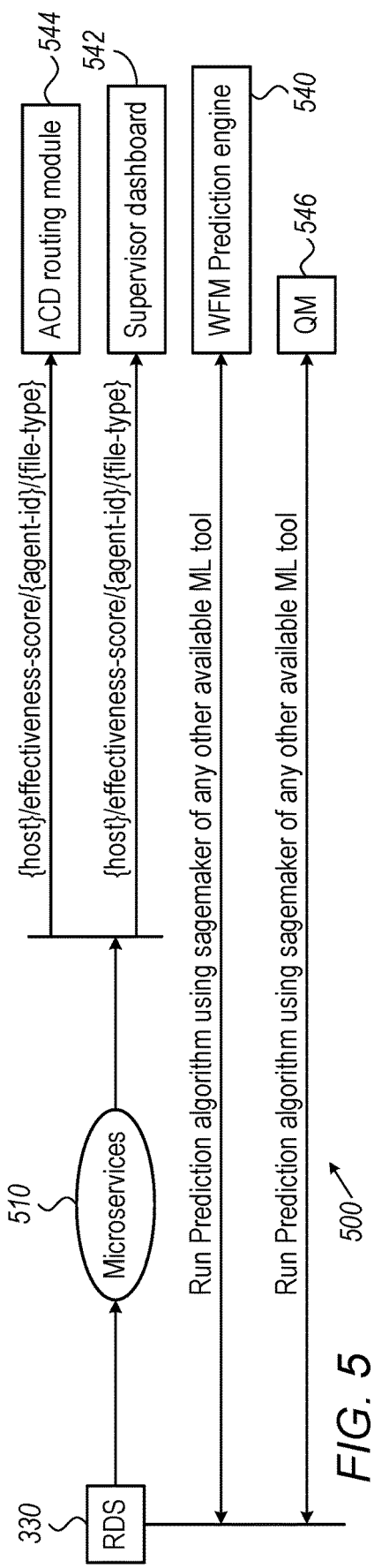
FIG. 5 depicts an example data utilizer module which may be used in some embodiments of the invention.

FIG. 5 depicts an example data utilizer module 500 which may be used in some embodiments of the invention. A plurality of scheduled jobs or microservice 510 may periodically (for example at predefined time intervals, such as for example once an hour/day/week/month, and so forth) extract, select or receive a plurality of data and/or information—such as for example calculated effectiveness scores, (e.g., conforming to the data structure formats illustrated in Tables 1-2, in addition to for example agent activity metrics, agent KPIs, and the like, as discussed herein)—from a database, which may or may not be RDS 330 or auxiliary database 332, and further send, transmit, or forward one or more sections or parts of the extracted data and/or information to appropriate data utilizers, such as for example a routing module operated by an ACD program or routing module 544 or a supervisor's dashboard 542. In some embodiments, sending or transmitting of data and/or information may be performed periodically (e.g., every 1 hour) in order to conform to the update rate and standards required by different data utilizers. Some embodiments of the invention may send, transmit, or forward one or more parts of the extracted data and/or information to one or more data utilizers or particular engines or modules of such utilizers which may for example use or execute additional data analysis and/or prediction procedures based on the extracted data and/or information. As a non-limiting example, data utilizers such as WFM 540 and QM 546 computer programs or applications may include or may be configured to further utilize appropriate prediction or prediction-related modules or engines, which may for example allow to run prediction algorithms involving various machine learning techniques as known in the art (in this context, cloud-based services such as for example Amazon Sagemaker may be used to run a variety of prediction machine-learning-based algorithms and communicate, e.g. periodically, with data utilizers such as the above via an appropriate interface). One skilled in the art may recognize that various alternative auxiliary modules and/or interfaces with computer programs or applications which may execute prediction and/or learning algorithms and/or procedures may be included in different embodiments of the invention.

Figure 6:
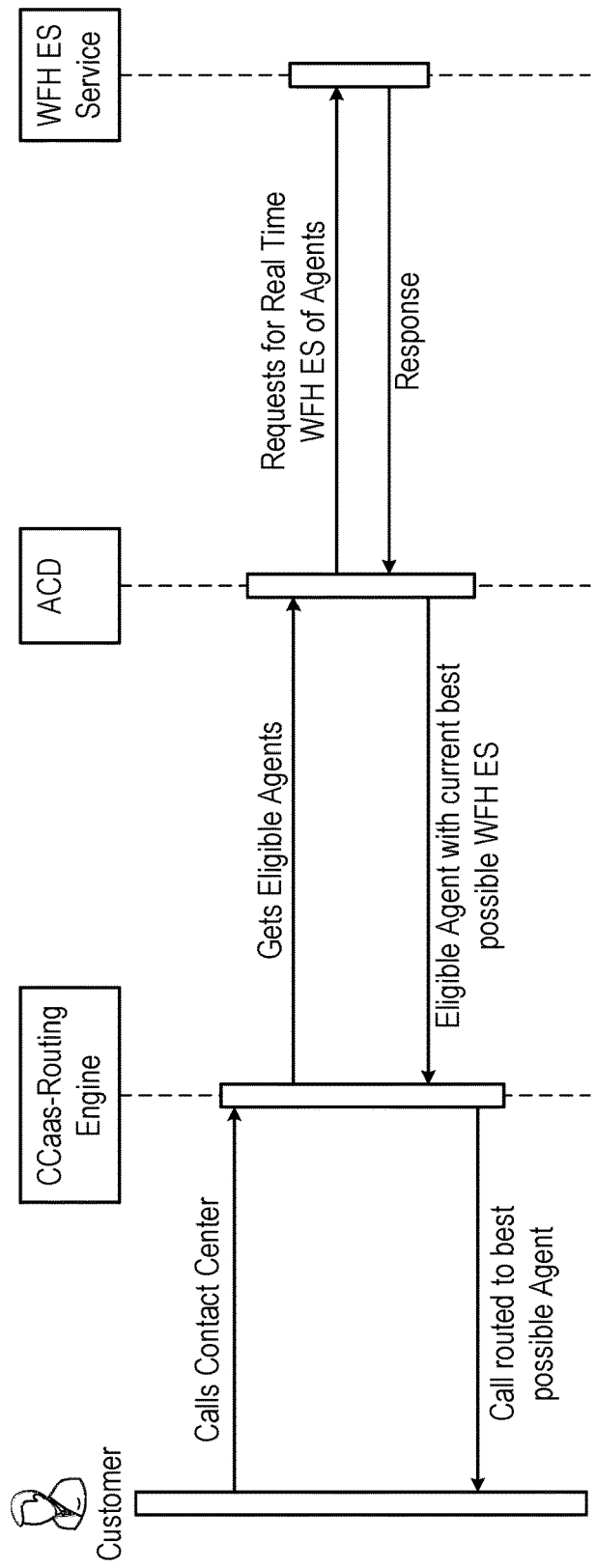
FIG. 6 illustrates a simple, example workflow of utilizing effectiveness scores as provided by embodiments of the invention in a contact center infrastructure.

FIG. 6 illustrates a simple, example workflow of utilizing effectiveness scores as provided by embodiments of the invention in a contact center infrastructure. A customer's call may be received by a routing engine of the contact center, which may be or may conform for example to a contact center as a service (CCaaS) infrastructure as known in the art. The routing engine may get or search for eligible or available agents which may receive or service the call under consideration, and send or forward the search results (as for example a list of agents) to an ACD program (such as element 544; see discussion herein)—which may, in order to determine which agent should service the call, further contact or communicate with a WFH effectiveness score (ES) service, which may for example include one or more of the components and/or modules described herein, to request real-time WFH ES s calculated for the available agents. In some embodiments, contacting the WFH ES service by an ACD program 544 may correspond to searching and/or querying an effectiveness score database—which may include a plurality of "work from home effectiveness datastore" entries, e.g., conforming to the exemplary format of Table 2—based on agent names of identifiers for the available agents. The ES service may accordingly respond with sending or forwarding the relevant calculated effectiveness scores to the requesting program—which may then for example select the agent for which the highest effectiveness score has been calculated (which may be considered as the "best possible agent" to service the call), and notify and/or signal the routing engine to route the customer's call to the selected agent (e.g. to a remote computing device operated by that agent). Note that different workflows and or components, which may be used in alternative contact center architectures, may be used in different embodiments of the invention—and that the present workflow should be considered non-limiting.

Figure 7:
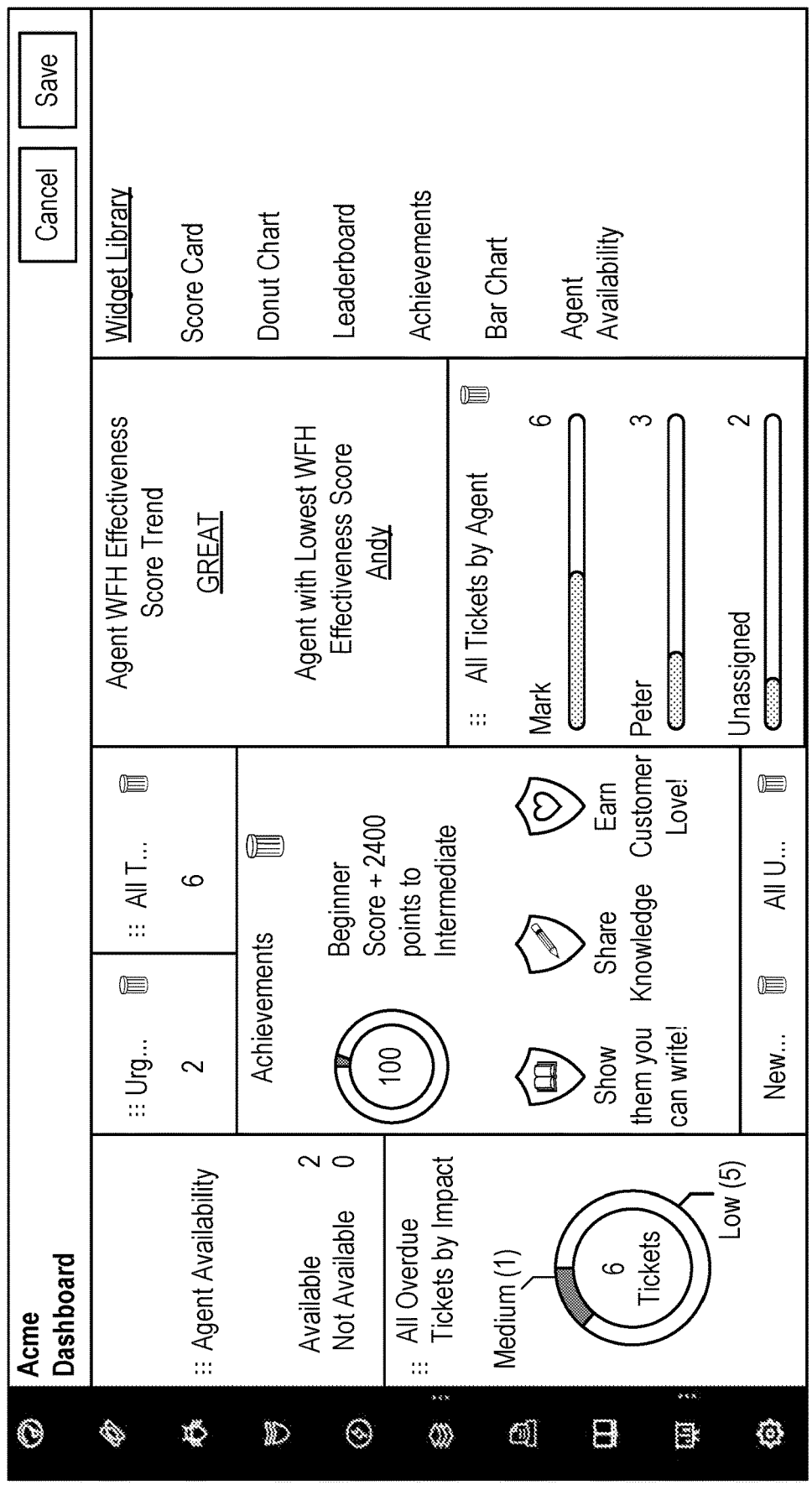
FIG. 7 illustrates an example supervisor's dashboard UI including descriptive statistics based on calculated effectiveness scores according to some embodiments of the invention.

Once scores calculated by embodiments of the invention are received by different computer programs and/or applications (which may be for example various applications and/or data utilizers as described herein), results may be presented via an appropriate user interface (UI) within such programs and/or applications as needed for example for the particular data utilizer at hand (as a non-limiting example, calculated scores which may belong for example to agents selected to be monitored according to a supervisor's decision, may be displayed on a supervisor's dashboard and updated on a daily or weekly bases to allow user-friendly monitoring by the supervisor. FIG. 7 illustrates an example supervisor's dashboard UI including descriptive statistics based on calculated effectiveness scores according to some embodiments of the invention. In this non-limiting example, a supervisor may only be interested in a few particular descriptive statistics on calculated effectiveness scores, such as for example whether a month-scale trend of calculated effectiveness scores is positive (meaning that work effectiveness by the monitored workers has improved over the corresponding timeframe), and which worker has the lowest effectiveness score calculated for that timeframe. In case for example the average calculated effectiveness score for the current timeframe (e.g. one month) is greater than a predefined threshold (e.g. 1.2 times the average score calculated for the preceding month), a "WFH effectiveness score trend" entry may be determined for example as "GREAT" (while in the case the current average score is lower than a predetermined threshold—e.g. 0.7 times that of the preceding month—that entry may be determined as "BAD", and so forth). In addition, the agent name or ID corresponding to for example the lowest effectiveness score calculated for the present month may be presented in another dedicated entry ("Agent with Lowest WFH Effectiveness Score"). Alternative schemes and forms of displaying calculated scores via a UI, for example in a plurality of contexts within different data utilizers, may be used in different embodiments of the invention.

FIG. 8 depicts a high-level architecture of an exemplary computerized system and method 800 according to some embodiments of the invention. Call data and/or metadata 810 and chat data and/or metadata 815 may be gathered or collected into data generator module 300 (which may be for example implemented in a streaming service as explained herein). Data generated by the latter may be further collected and processed by data processor module 400, for example in order to calculate WFH effectiveness scores as described herein (e.g., using formulas 1 and/or 2). Output data and/or results by data processor module 400 may be stored in an appropriate database 830 (which may or may not be RDS 330) which may thus comprise information describing for example real time and history of agents' work activity. Data and/or results stored in database 830 may be sent to or collected by a plurality of data utilizers, such as WFM 540, supervisor device (to provide for example a notification or alert) 542, ACD 544, and QM 546 programs and/or applications—which may, in turn, perform automated actions based on the data as described herein.

FIG. 9 is a flowchart depicting a simple method for analyzing data representing and/or recorded from remotely connected computer systems or their activity or data exchanges (which may be for example used by workers or agents as part of their WFH routine) according to embodiments of the invention. A computer processor may be configured to collect plurality of data streams (including for example call metrics and call metadata) (step 910) and store the collected data streams in a database (step 920); subsequently, the processor may be configured to, for example for each agent included in a data store of agents' data and metrics, periodically extract one or more parts of the stored data streams (step 930); calculate an effectiveness score (such as an agent WFH effectiveness score) based on the extracted parts (step 940); calculate an average effectiveness score based on the calculated effectiveness scores (step 950); and transmit the calculated scores to a plurality of applications (step 960), where the scores may be presented via an appropriate UI.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A computerized-method for analyzing data representing remotely connected computer systems, the computerized-method comprising:
in a computerized-system comprising one or more processors, and a memory including a data store of agents' data and metrics, the one or more processors configured to:
collect a plurality of data streams, the data streams including at least one of: call metrics, call metadata, chat metrics, and chat metadata, wherein one or more of the data streams comprises call data recorded from one or more remote computers, each of the one or more remote computers operated by an agent of a plurality of agents, and wherein one or more of the data streams is collected in real time;
store in a database one or more of the collected data streams;
for each agent of the plurality of agents, periodically performing:
calculating an agent Working From Home (WFH) effectiveness score based on one or more extracted parts of the stored data streams, the calculating of an WFH effectiveness score using a signal to noise ratio;
calculating an average effectiveness score based on the one or more calculated effectiveness scores;
transmitting one or more of the calculated scores to one or more applications to be presented via a User Interface (UI); and
automatically routing, by an automatic call distributor (ACD), a call to at least one of the agents based on one or more the calculated scores, wherein the routing comprises, when the call is received, providing one or more of the calculated scores to the ACD in real time.

2. The computerized-method of claim 1, wherein the calculating an AWFH effectiveness score comprises a calculation based on one or more of: a number of calls received, a number of calls not accepted, a number of calls dropped, an agent response time, and one or more priority constants.

3. The computerized-method of claim 1, wherein the collected data streams comprise:
one or more identifiers describing at least one of: a given agent, a tenant, and contact; and
one or more variables describing at least one of: an acceptance of a call, a call noise factor, an agent response time, a drop of a call, a total number of calls, and a file type.

4. The computerized-method of claim 1, wherein the calculating of an AWFH effectiveness score comprises calculating one or more subscores describing at least one of: an agent's health, an agent's sentiment, and a key performance indicator.

5. The computerized-method of claim 1, wherein the average effectiveness score comprises an hourly effectiveness score.

6. The computerized-method of claim 1, wherein the one or more applications include at least one of: an Automated Call Distribution (ACD) system application, a Workforce Management (WFM) application, a Quality Management (QM) application, and a monitoring application operated by a supervisor of a given agent.

7. The computerized-method of claim 1, wherein at least one of the collecting and the storing of a plurality of data streams is performed by a data generator module.

8. The computerized-method of claim 1, comprising:
extracting one or more of the parts from the stored data streams; and
storing one or more the calculated scores in the database, wherein at least one of: the extracting of one or more parts from the stored data streams, the calculating of an effectiveness score, and the storing of the calculated scores is performed by a data processor module.

9. The computerized-method of claim 1, wherein the transmitting one or more of the calculated scores is performed by a data utilizer module.

10. A computerized-system for analyzing data representing remotely connected computer systems, the system comprising:
one or more processors, and
a memory including a data store of agents' data and metrics; and
wherein the one or more processors are to:
collect a plurality of data streams, the data streams including at least one of: call metrics, call metadata, chat metrics, and chat metadata, wherein one or more of the data streams comprises call data recorded from one or more remote computers, each of the one or more remote computers operated by an agent of a plurality of agents, and wherein one or more of the data streams is collected in real time;
store in a database one or more of the collected data streams;
for each agent of the plurality of agents, periodically perform:
calculate an agent Working From Home (WFH) effectiveness score based on one or more extracted parts of the stored data streams, the calculating of an WFH effectiveness score using a signal to noise ratio;
calculate an average effectiveness score based on the one or more calculated effectiveness scores;
transmit one or more of the calculated scores to one or more applications to be presented via a User Interface (UI); and
automatically route, by an automatic call distributor (ACD), a call to at least one of the agents based on one or more the calculated scores, wherein the routing comprises, when the call is received, providing one or more of the calculated scores to the ACD in real time.

11. The computerized-system of claim 10, wherein the calculation of an AWFH effectiveness score comprises a calculation based on one or more of: a number of calls received, a number of calls not accepted, a number of calls dropped, an agent response time, and one or more priority constants.

12. The computerized-system of claim 10, wherein the collected data streams comprise:
one or more identifiers describing at least one of: a given agent, a tenant, and contact; and
one or more variables describing at least one of: an acceptance of a call, a call noise factor, an agent response time, a drop of a call, a total number of calls, and a file type.

13. The computerized-system of claim 10, wherein the one or more processors are to calculate one or more subscores describing at least one of: an agent's health, an agent's sentiment, and a key performance indicator.

14. The computerized-system of claim 10, wherein the average effectiveness score comprises an hourly effectiveness score.

15. The computerized-system of claim 10, wherein the one or more applications include at least one of: an Automated Call Distribution (ACD) system application, a Workforce Management (WFM) application, a Quality Management (QM) application, and a monitoring application operated by a supervisor of a given agent.

16. The computerized-system of claim 10, wherein at least one of the collecting and the storing of a plurality of data streams is performed by a data generator module.

17. The computerized-system of claim 10, wherein the one or more processors are to:
    extract one or more of the parts from the stored data streams; and
    store one or more the calculated scores in the database, wherein at least one of: the extracting of one or more parts of the stored data streams, the calculating of an effectiveness score, and the storing of the calculated scores is performed by a data processor module.

18. The computerized-system of claim 10, wherein the transmitting one or more of the calculated scores is performed by a data utilizer module.

19. A computerized-method for analyzing data representing remotely connected computer systems, the computerized-method comprising:
    in a computerized-system comprising one or more processors, and a memory including a data store of data and metrics recorded from at least one remote computer of a plurality of remote computers, the one or more processors configured to:
    gather a plurality of data streams, the data streams including at least one of: call metrics, call metadata, chat metrics, and chat metadata, wherein one or more of the data streams comprises call data recorded from one or more of the remote computers, each of the one or more remote computers operated by an agent of a plurality of agents, and wherein one or more of the data streams is collected in real time;
    for each remote computer, periodically performing:
    querying one or more parts of the gathered data streams;
    calculating a Working From Home (WFH) effectiveness score based on one or more of the queried parts, the calculating of an WFH effectiveness score using a signal to noise ratio;
    calculating an average effectiveness score based on the one or more calculated effectiveness scores;
    sending one or more of the calculated scores to one or more applications to be presented via a User Interface (UI) thereof; and
    automatically routing, by an automatic call distributor (ACD), a call to at least one of the remote computers based on one or more the calculated scores, wherein the routing comprises, when the call is received, providing one or more of the calculated scores to the ACD in real time.

20. The computerized-method of claim 19, wherein the sending one or more of the calculated scores is performed by a data utilizer module.

* * * * *